(12) United States Patent
Takahashi et al.

(10) Patent No.: US 7,367,101 B2
(45) Date of Patent: May 6, 2008

(54) FILLER PIPE

(75) Inventors: Yukikazu Takahashi, Fuji (JP); Nobuhide Suzuki, Fuji (JP)

(73) Assignee: Unipres Corporation, Yokohama-shi (JP)

( * ) Notice: Subject to any disclaimer, the term of this patent is extended or adjusted under 35 U.S.C. 154(b) by 430 days.

(21) Appl. No.: 10/852,237

(22) Filed: May 25, 2004

(65) Prior Publication Data

US 2004/0256522 A1 Dec. 23, 2004

(30) Foreign Application Priority Data

Jun. 9, 2003 (JP) ............................. 2003-163127

(51) Int. Cl.
*B23P 19/04* (2006.01)
*F16L 3/22* (2006.01)
*F16L 3/08* (2006.01)

(52) U.S. Cl. ...................... 29/460; 248/68.1; 248/214; 248/65; 285/124.1

(58) Field of Classification Search ............... 248/68.1, 248/214, 49, 65, 67.7, 219.4; 285/342, 124.1–124.3; 29/890.038, 890.043, 890.054, 460, 527.2; 403/191, 270–272, 199, 188; 174/94 R, 174/16.2, 72 R; 228/164; 296/97.22

See application file for complete search history.

(56) References Cited

U.S. PATENT DOCUMENTS

| | | | | |
|---|---|---|---|---|
| 1,914,344 A | * | 6/1933 | Ragsdale | ...................... 403/170 |
| 2,885,462 A | * | 5/1959 | Sylvester | .................. 174/94 R |
| 5,298,059 A | * | 3/1994 | Takimoto et al. | ........ 106/14.17 |

FOREIGN PATENT DOCUMENTS

KR 0156361 * 7/1998

* cited by examiner

*Primary Examiner*—David P. Bryant
*Assistant Examiner*—Christopher M Koehler
(74) *Attorney, Agent, or Firm*—Ditthavong Mori & Steiner, P.C.; Phouphanomketh Ditthavong; Massayasu Mori

(57) ABSTRACT

A filler pipe for introducing a fuel from a fuel inlet to a fuel tank. Connected to the filler pipe 10 is a bracket 14, which has a cross-section of a "hat" shape and is constructed by bottom wall portions 14-1 located at its ends and is under a face to face contact with an outer surface of the filler pipe 10 and an upper wall portion 14-3 located between the bottom wall portions 14-1 and spaced from the opposite outer surface of the filler pipe 10. The bottom wall portions 14-1 are welded to the opposed surface of the filler pipe. The bracket 14 has a wing part 14-5 extending integrally from the upper wall part 14-3 and having a free end 14-5' welded to the opposed surface of a breather pipe.

7 Claims, 6 Drawing Sheets

FILLER PIPE

BACKGROUND OF THE INVENTION

1. Field of the Invention

The present invention relates to a filler pipe for feeding the fuel from a fuel inlet to a fuel tank in an automobile.

2. Description of Related Art

A filler pipe is used in an automobile for feeding the fuel from a fuel inlet to a fuel tank. Such a filler pipe is combined with a breather pipe, which functions for venting the space above a liquid level in the fuel tank and is provided with a bracket for fixing the filler pipe together with the breather pipe with a vehicle body. Conventionally, such a filler pipe is made from a steel material, in which a painting or plating is necessary as a countermeasure to the problem of corrosion. Recently, from a viewpoint of reduction of weight, a filler pipe made of a stainless steel has been proposed. In a well-known manner, the stainless steel forms, on its outer surface, a passive layer of an increased corrosion resistance, by which a surface coating by a painting or plating becomes basically unnecessary. However, the stainless steel is accompanied with a problem of so-called crevice corrosion. The crevice corrosion is a phenomenon where a contact of a water with a crevice causes an electric potential difference to be created between the portion of the crevice of a low oxygen density and an out side portion of a high oxygen density, thereby creating a so-called corrosion battery as a kind of an oxygen concentration cell. In the corrosion battery, the crevice becomes as an anode, whereat corrosion is likely generated. The filler pipe is provided with a bracket for allowing the filler pipe to be fixed with the vehicle body. In the case where a fixture of such a bracket is done by a welding, the welding along the entire periphery of the mating surfaces between the filler pipe and the bracket is actually difficult, which would otherwise increase the labor cost unreasonably. Thus, to some extent, gaps are inevitably created at the welded portion, whereat corrosion is likely generated. As a measure to the crevice corrosion as occurred by welding, a coating with a paint is usually employed and a cation electrodeposition coating popular is suitable in view that a strong coated film is obtained at a low cost. U.S. Pat. No. 6,615,498 (Japanese Un-Examined Patent Publication No. 2002-242779) discloses a cation electrodeposition coating to a filler pipe made of stainless steel.

In the prior art, a usual teaching for combating corrosion is a coating by paint. Namely, an application of paint is done in such a manner that the coated film covers a gap between the welded surfaces by the paint. However, the coating by the paint usually accompany with problems that a thickness of the coated film is varied and a flow of the paint is not enough to completely fill the gap, so that a possibility of a generation of the crevice corrosion is still left.

In order to completely prevent the crevice corrosion from being occurred, a two-piece structure is proposed, wherein the filler pipe and the bracket are coated with the cation paint separately, which is followed by a bolt connection of the bracket to the filler pipe. In this case, a space between the filler pipe and the bracket is completely filled by the coated film, so that any crevice corrosion does not occur. However, due to the resultant increase in the total number of parts, a cost is increased over that of the one-piece structure.

SUMMARY OF THE INVENTION

An object of the present invention is to provide a filler pipe capable of overcoming the above-mentioned drawbacks in the prior arts.

Another object of the present invention is to provide a filler pipe with a bracket of an integral structure, capable of preventing any substantial gap from being created between the filler pipe and the bracket.

According to the present invention, a filler pipe assembly is provided, comprising a filler pipe and a bracket, which is welded to an outer surface of said filler pipe, said filler pipe and said bracket being made of stainless steel, said bracket comprising a first portion closely contacting with the outer surface of the filler pipe and a second portion which is raised from the first portion so that the second portion is spaced from the outer surface of the filler pipe, said first portion of the bracket being under an integrated condition with opposed outer surface of the filler pipe facing said first portion by mutually fusing each other along substantially entire area.

In this aspect of the present invention, the mutually fused structure can prevent any substantial gap from being created at the contact area (welded area) between the bracket and the filler pipe, so that any corrosion under the principle of the corrosion battery does not occur, which may otherwise cause the stainless steel to be subjected to a rust. Thus, a desired degree of the corrosion resistance is obtained without necessitating a coating with paint, resulting in a reduction of production cost accordingly. In addition, from the structural viewpoint, the bracket is one-piece structure, which prevents a number of parts from being increased, which is advantageous in that the part cost is reduced. Finally, the area of the fist portion of the bracket contacting with the filler pipe can be desirably set in a manner that a necessary strength is obtained.

Preferably, the filler pipe further comprises an accessory pipe and wherein said bracket comprises a third portion which is integrally extended from said second portion, said third portion being at its end welded to the opposed surface of said the accessory pipe. In this structure, a welded area of the bracket to the accessory pipe is small enough so that a close contact between the bracket and the accessory pipe along the entire area is easily obtained due to the complete fusing during the welding, so that no gap is generated at the welded portion between the bracket and the accessory pipe. As a result, any occurrence of crevice corrosion is not likely. Furthermore, due to the small diameter of the accessory pipe, a mere welding of the end of the bracket to the accessory pipe is enough to obtain a desired welding strength.

In a second aspect of the invention, a filler pipe assembly is provided, comprising a filler pipe and a bracket, which is welded to an outer surface of said filler pipe, said filler pipe and said bracket being made of stainless steel, said bracket having spaced first portions which are face to face contact with the outer surface of said filler pipe and a second portion intermediate between said first portions and spaced from the opposed surface of the filler pipe, said first portions of the bracket being welded to the opposed outer surface of the filler pipe a filler pipe assembly is provided, which comprises a filler pipe and a bracket, which is welded to an outer surface of said filler pipe, said filler pipe and said bracket being made of stainless steel, said bracket having spaced first portions which are face to face contact with the outer surface of said filler pipe and a second portion intermediate between said first portions, said second portion of the bracket being welded to the opposed outer surface of the filler pipe.

In a third aspect of the invention, a filler pipe assembly is provided, comprising a filler pipe and a bracket, which is welded to an outer surface of said filler pipe, said filler pipe and said bracket being made of stainless steel, said bracket having a first portion which is face to face contact with the outer surface of said filler pipe and spaced second portion astride said first portion so that the second portion is spaced from the opposed surface of the filler pipe, said first portion of the bracket being welded to the opposed outer surface of the filler pipe In the second or third aspect of the invention, the bracket forms in its cross-section a "hat" or "reverse hat" shape, wherein the first portion (bottom surface portion) of the bracket is lowered and the second portion (upper surface portion) is raised. The bottom surface portion in face-to-face contact with the filler pipe can have a minimum surface area, which is enough to obtain the desired weld strength. The bottom surface portions of reduced size form, along the entire area, a fused and integrated state with respect to the opposed portions of the surface of the filler pipe, thereby obtaining a closely contacted condition along the substantially entire area, i.e., no gap structure. Thus, crevice corrosion is prevented even without any coating by paint such as a cation electrodeposition coating, thereby reducing production cost. Furthermore, the bracket is of one-piece structure, which prevents the number of parts from being increased, which is advantageous from the viewpoint of the reduction of the cost.

In the present invention, said filler pipe together with the bracket welded to the filler pipe are preferably coated with cation paint. By the coating with the cation paint, a coated film is created on the welded portion, so that a further increase in the corrosion resistance capacity is obtained.

In the present invention, said second portion of said bracket is formed with an opening therethrough. In this construction, during the execution of cation coating by the paint, the latter is flown inwardly via the opening, so that the paint is well penetrated to the mating faces between the filler pipe and the bracket, thereby realizing an increased corrosion resistance with respect to the crevice corrosion.

In the present invention, a method is also provided, comprising the steps of:

providing a filler pipe and a bracket, which is welded to an outer surface of said filler pipe, said filler pipe and said bracket being made of stainless steel, said bracket comprising a first portion and a second portion which is displaced from the first portion, and;

welding the filler pipe and the bracket such that said first portion of the bracket is welled to the opposed outer surface of the filler pipe facing said first portion by mutually fusing each other along substantially entire are and said second portion is raised from the first portion so that the second portion is spaced from the outer surface of the filler pipe, thereby obtaining an assembly of the filler pipe integrated with the bracket.

BRIEF EXPLANATION OF ATTACHED DRAWING

DETAILED DESCRIPTION OF PREFERRED EMBODIMENTS

Figure 1:
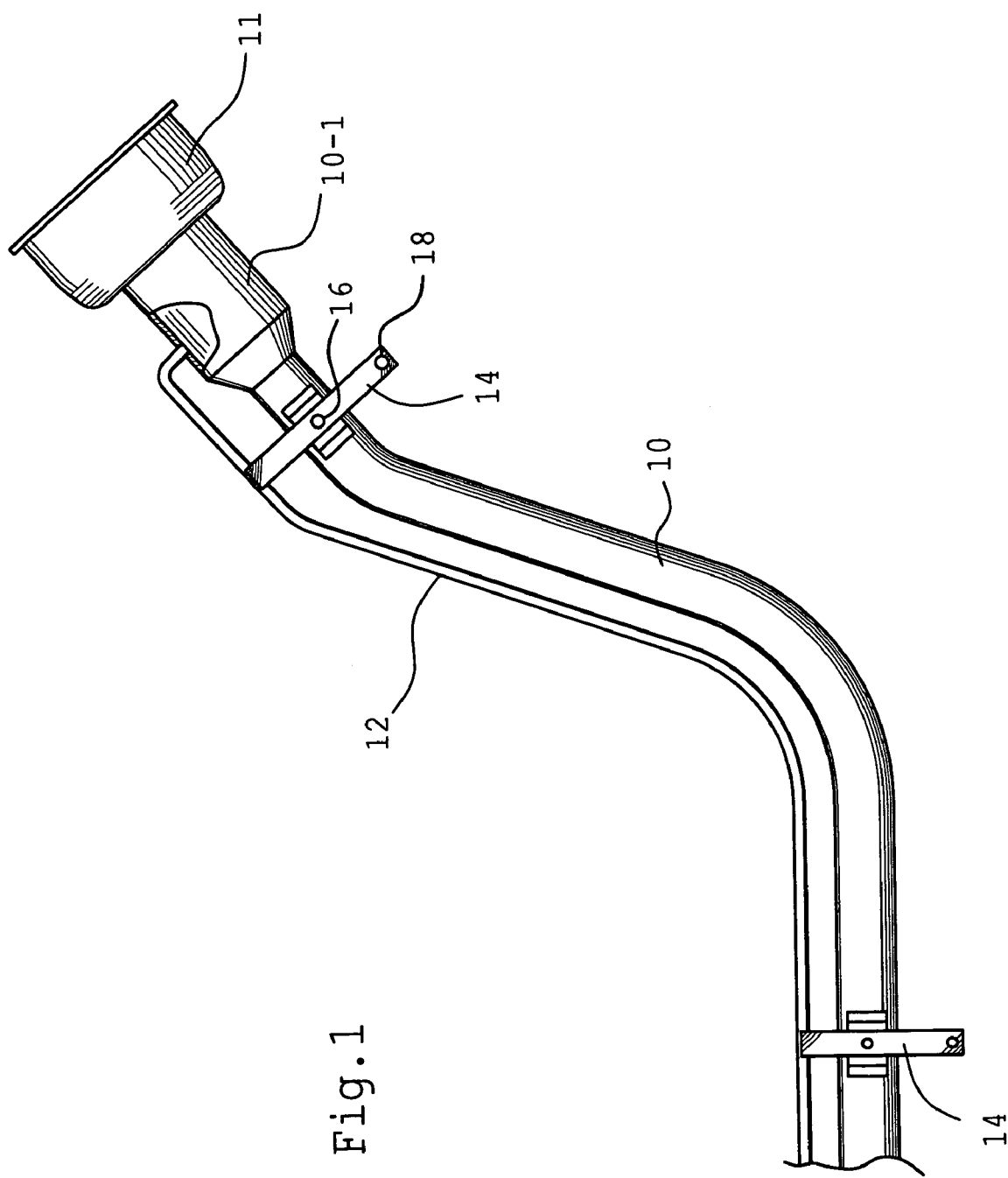
FIG. 1 is schematic side view of a filler pipe according to the present invention.

In FIG. 1, a reference numeral 10 denotes a filler pipe made of a stainless steel. The filler pipe 10 is, at its one end, enlarged in the diameter in a manner that a portion 10-1 for the connection to a breather pipe is connected. The breather pipe connection portion 10-1 constructs a mounting part for a cap protector 11. The filler pipe 10 is, at the other end, extended to a fuel tank, which is not shown in FIG. 1.

A reference numeral 12 denotes a breather pipe as an accessory pipe, which is made of a stainless steel. The breather pipe 12 is, at its one end, connected to the breather pipe connection portion 10-1 by a welding, so that the breather pipe 12 is opened to the space inside the filler pipe 10 which is always located above the fuel level formed therein. The breather pipe 12 is, at the other end, connected to the not shown fuel tank in a manner that it is opened to the space inside the fuel tank above the level of the fuel stored therein, thereby always venting the space.

Figure 2:
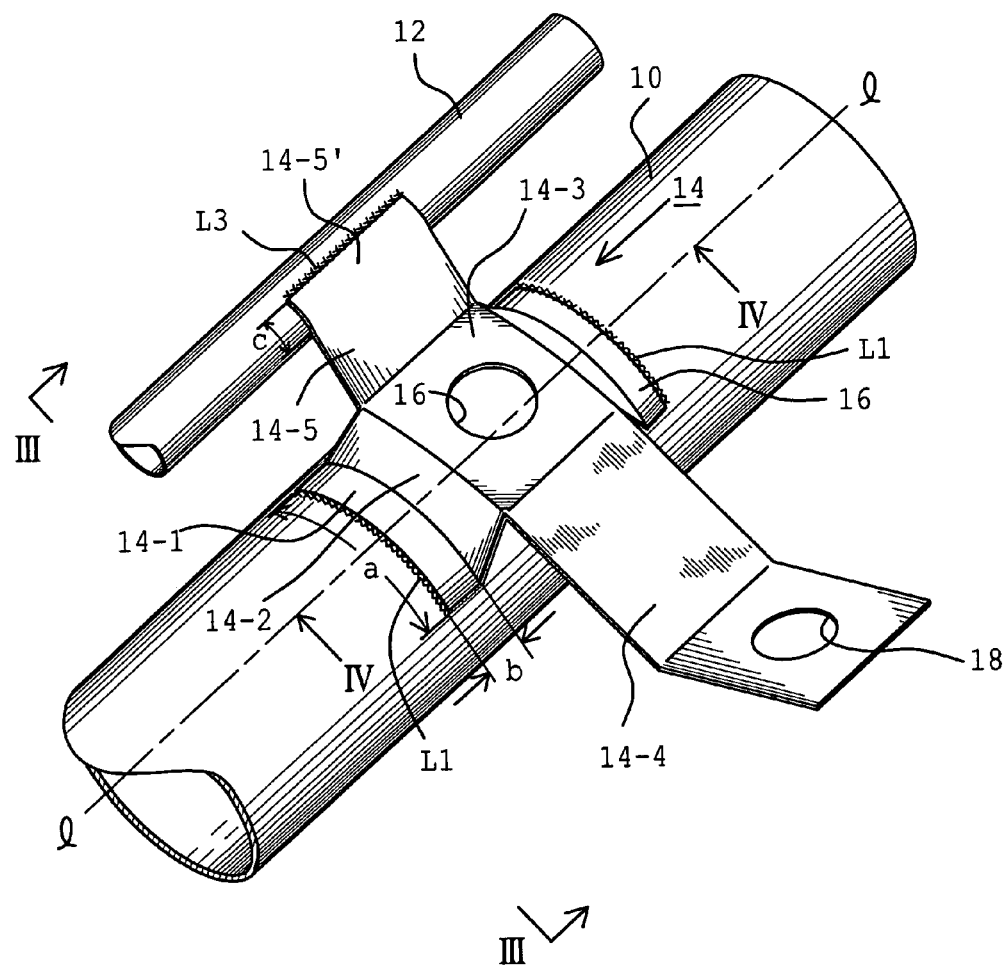
FIG. 2 is a perspective, enlarged view of illustrating how a bracket is connected to the filler pipe and breather pipe.
Figure 3:
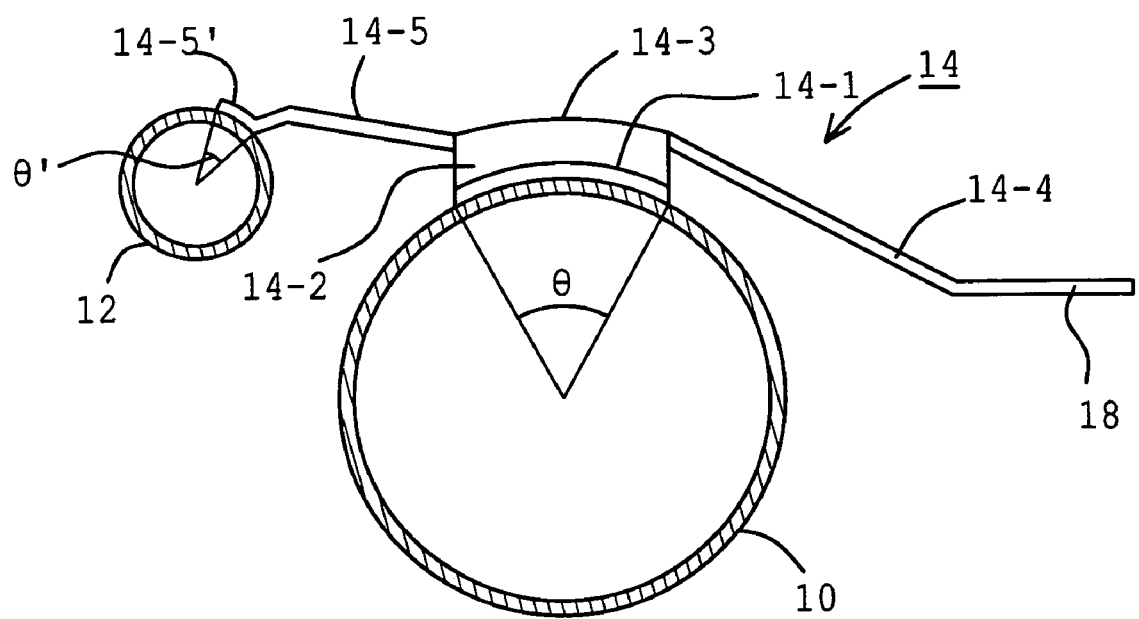
FIG. 3 is a cross-sectional view taken along a line III-III in FIG. 2.
Figure 4:
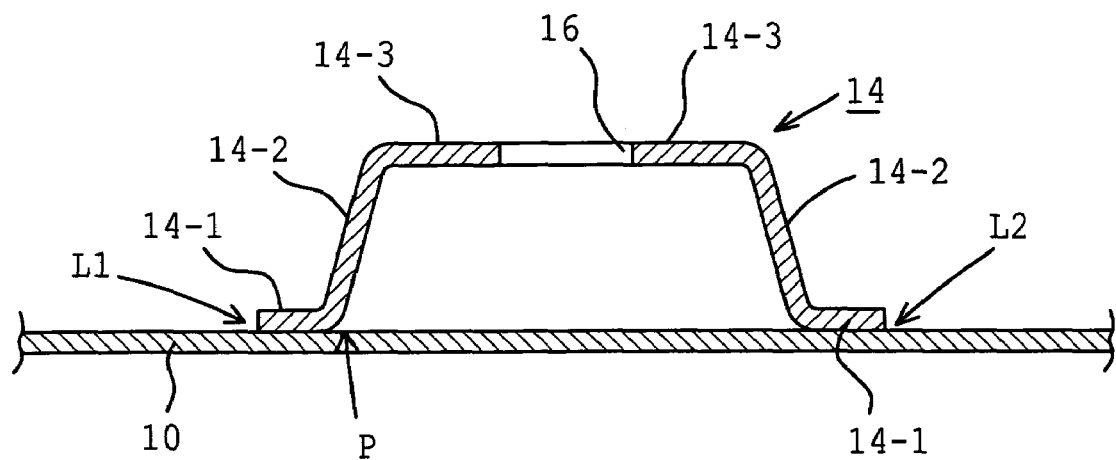
FIG. 4 is a cross-sectional view taken along a line IV-IV in FIG. 2.

The bracket 14 is formed by a stainless steel and is, as will be fully described later, welded to the filler pipe 10 as well as the breather pipe 12. The filler pipe 10 together with the breather pipe 12 is connected to a suitable part of the vehicle body by means of the bracket 14. As illustrated in FIGS. 2 and 3, the bracket 14 is formed with a pair of bottom wall portions 14-1 spaced in a direction parallel to the axis of the filler pipe 10 and with an upper part 14-3 raised by leg portions 14-2 almost at a right angle from the respective bottom wall portions 14-1. Thus, as shown in FIG. 4, the bracket forms a shape which can refer as a "hat" shape in the transverse cross section, which is parallel to the axis of the filler pipe 10. The bottom wall portions 14-1 extends in a circumferential direction for a length a (FIG. 2) corresponding to a circumferential angle θ (FIG. 3), while keeping a close contact with the outer surface of the filler pipe 10 and extends in an axial direction for a width b (FIG. 2). The value of the area a×b of the bottom portion 14-1 contacting with the filler pipe 10 is as small as possible, which is able to keep a desired strength of the welded portion of the bracket to the filler pipe 10. As shown in FIG. 2, the raised portion 14-3 of the bracket 14 is formed with a through hole 16, which assists a paint to be smoothly flown during the execution of a cation electrodeposition coating of the filler pipe 10. As shown in FIG. 2, from the upper part 14-3 of the bracket 14, a first and second wing portions 14-4 and 14-5 are integrally extended in opposite directions which are transverse to the axis of the filler pipe 10. The first wing portion 14-4 is formed with a bolt opening 18, to which is a bolt (not shown) is passed in a manner that the bolt is tightened to a screw thread (not shown) formed in an appropriate portion of the vehicle body, thereby fixedly connecting the filler pipe 10 to the vehicle body. Furthermore, the second wing portion 14-4 has an end 14-5', which extends in the circumferential direction for a length c (FIG. 2) corresponding to a circumferential angle θ' (FIG. 3) and which is welded to the opposed surface of the breather pipe 12.

Figure 5:
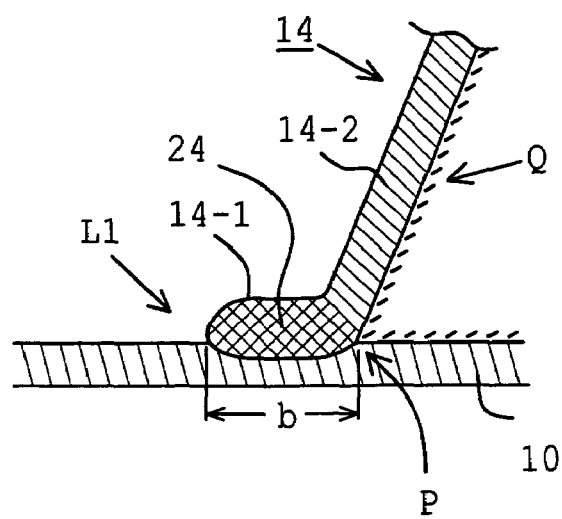
FIG. 5 is a partial enlarged view of a portion of FIG. 4 and illustrates schematically a connecting portion of the bracket to the filler pipe.

Now, a welding of the bracket 14 to the filler pipe 10 and the breather pipe 12 will be explained. As shown in FIG. 2, the bracket 14 is, at the pair of the bottom surface portions 14-1, contacted with the filler pipe 10 and an arc welding, for example, MIG welding is done. In FIG. 2, welded portions (welding lines) are illustrated by $L_1$ and $L_2$, which extend along the edges of the bottom portions 14-1 extending in the circumferential direction for a length of a. The welded lines $L_1$ and $L_2$ are also illustrated in FIG. 4. FIG. 5 illustrates schematically a welded condition of the bottom walls 14-1 of the bracket 14 to the opposed outer surface of the filler pipe 10. During the welding process, a welding rod is molten, which causes a heat to be generated, by which heat the bottom wall portion 14-1 and the portion of the upper surface faced with the bottom wall portion 14-1 are, along the entire faced area, molten with each other and are integrated so that a molten portion 24 is formed as illustrated by crossed hatched lines in FIG. 5. In order to create such a portion 24, the axial dimension of the bottom wall portion 14-1 of the filler pipe 10, i.e., the width of the bottom wall portion 14-1 is determined such that the entire area facing the filler pipe 10 is completely molten by the heat as generated when the welding is executed. Namely, even at the edges remote from the welding lines $L_1$ and $L_2$, i.e., transition portions P from the bottom wall portion 14-1 to the leg portions 14-2 in the bracket, the bottom wall 14-1 is completely molten, so that a mutual integrated or fused structure is obtained with respect to the opposed surface of the filler pipe 10. Furthermore, the length a of the bottom wall 14-1 in the circumferential direction of the filler pipe 10 is determined such that, even at the small value b of the width, a desired strength of the welded portion is obtained. In short, according to the present invention, an integrated, mutually fused structure of the bracket 14 along the substantially entire opposed surface of the filler pipe 10 is obtained, resulting in a substantial elimination of gap between the opposed surfaces in the welded portion, while keeping a desired strength of the welded portion.

A welding between the breather pipe 12 and the bracket 14 is done at the end 14-5' of the second wing portion 14-5 from the upper part 14-3 of the bracket 14. Namely, the end 14-5' of the second wing portion 14-5 of the bracket 14 is, at the edge in the longitudinal direction of the breather pipe 12, subjected to an arc welding such as MIG welding along the welded portion as shown by a line $L_3$ in FIG. 3. Due to the small diameter of the breather pipe 12, a relatively small welding area is enough to maintain a desired strength. Thus, a welding of the end 14-5' facing the breather pipe 12 can solely keep the desired strength. Furthermore, due to a small width c of the end 14-5', a heat can be fully imparted to a contacted portion of the bracket 14 to the breather pipe 12, which is most spaced from the welded line $L_3$. As a result, the end portion 14-5' as a welded part of the bracket 14 to the breather pipe 12 is molten along the entire surface and is closely contacted with the opposed surface, resulting in a formation of a mutually integrated structure. Thus, in the same principle as explained with reference to FIG. 5, a substantially gap-less connection is obtained also at the welded portion between the breather pipe 12 and the bracket 14, so that a clevis corrosion is prevented and a surface treatment such as a coating by a paint or a metal plating is not always needed.

As explained above, the bracket 14 according to the present invention is made contact with the opposed surface of the filler pipe 10 only at the bottom wall portions in the cross-section along the direction of the longitudinal axis, so that the intermediate upper wall part 14-3 is spaced from the filler pipe, thereby providing a cross-sectional shape of "hat". Furthermore, the welding of the bracket 14 to the filler pipe 10 is done only at the bottom wall portions 14-1 at the both ends of and the bracket 14. Furthermore, the setting of the dimension b of the area of the bottom wall portion 14-1 in the direction orthogonal to the welding line $L_1$ along the circumferential direction is such that the entire surface faced with the filler pipe 10 is molten by the heat as occurred by the welding, resulting in an execution of a welding with no substantial crevice while keeping a necessary welding strength by a setting of a necessary length (dimension) a of the bottom wall portion 14-1 along the welding line. Namely, an integrally mutually fused condition 24 with no substantial crevice is obtained at the contacting surfaces between the filler pipe 10 and the bracket, i.e., the filler pipe 10 and the bottom wall portion 14-1 of the bracket 14. Thus, without applying any coating by paint to the mere welded structure between the filler pipe 10 and the bracket 14, any problem related to a crevice does not occur. Under the same reason, a closely contacted, idealized welded condition is obtained at the welded portion between the breather pipe 10 and the bracket 14, so that a crevice corrosion problem does not occur.

As a modification of the present invention, a cation electrodeposition coating may be executed after the completion of the assembly of the filler pipe 10, i.e., after the filler pipe 10 is integrated with the breather pipe 12 by means of the bracket 14. In this case, the filler pipe 10 is dipped to cation paint (alkaline cation paint), and, then, a DC electric current is applied between an electrode and the filler pipe, so that a uniform coated layer is created on the surface of the filler pipe 10. In the construction of the filler pipe 10 according to the present invention, there is, still, a small possibility that a crevice, which may cause a crevice corrosion to occur, is created at a transition region P (FIG. 5) from the bottom wall portion 14-1 to the leg portions 14-2 at the inner surface of the bracket 14 facing the filler pipe 10. However, due to the formation of the coated layer along the entire surface by the execution of the cation electrodeposition coating, an ideally enhanced corrosion resistance capacity is realized. Namely, a coated layer Q is formed even at the inner surface of the bracket, so that the paint is penetrated to the transition region P, thereby obtaining highly enhanced corrosion resistance capacity. Finally, by the provision of the through-hole 16 at the top surface portion 14-3, a smooth flow of the paint to the inner surface side of the bracket is obtained during the dipping to the paint, so that an idealized stage of the formation of the coating is obtained at the inner surface side of the bracket, thereby obtaining a completeness as far as the prevention of the crevice corrosion is concerned.

Figure 6:
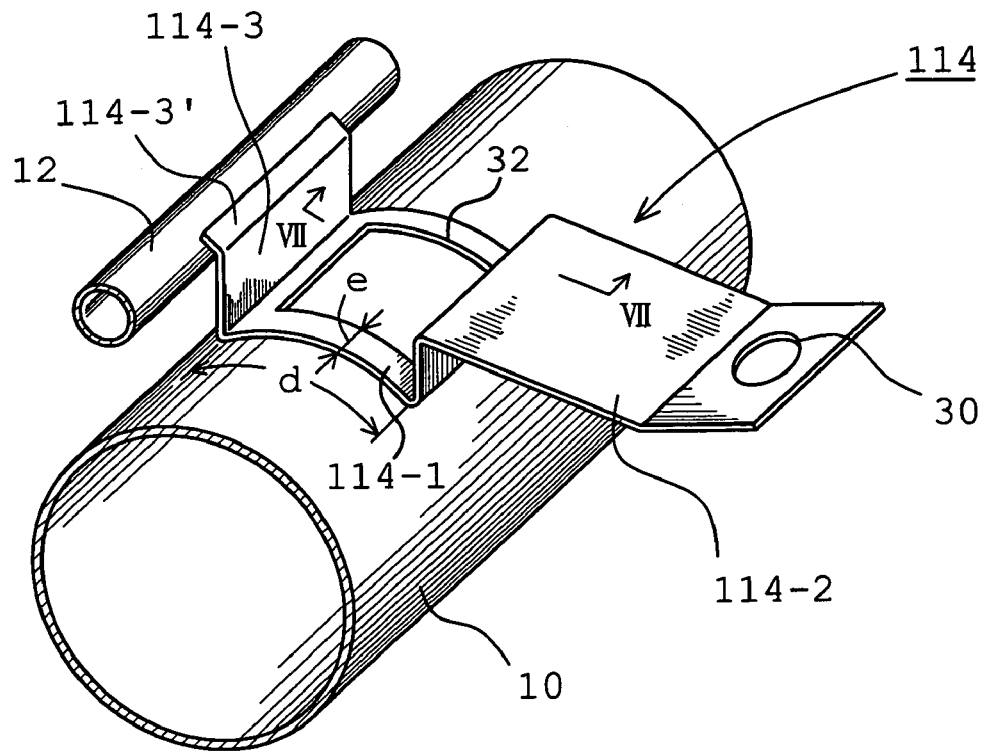
FIG. 6 is, in a second embodiment of the present invention, a perspective enlarged view of illustrating how a bracket is connected to the filler pipe and breather pipe.
Figure 7:
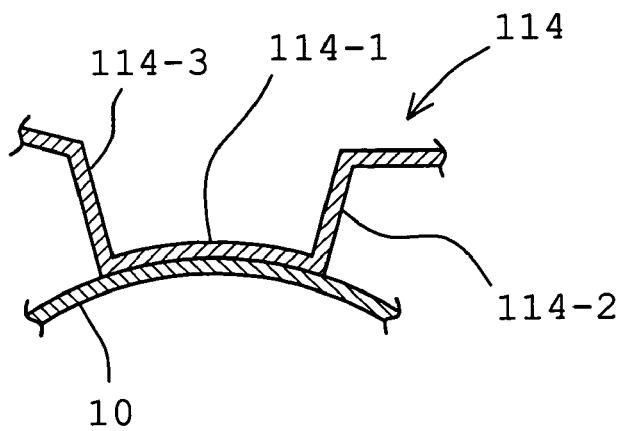
FIG. 7 is a cross-sectional view taken along a line VII-VII in FIG. 6.

In the above-mentioned embodiment, the bracket has a cross-sectional shape as a "hat". However, the idea of the present invention can also be realized even when the bracket has a cross-sectional shape as a "reversed hat". Namely, a bracket 114 FIGS. 6 and 7 show a second embodiment of the present invention, where a bracket 114 has an intermediate bottom wall portion 114-1 and wing portions 114-2 and 114-3, which are raised at an angle close to a right angle from the bottom wall portion 114-1. As a result, in a cross-section transverse to the axis of the filler pipe 10, the bracket forms a shape which is to be called as a reversed hat shape. The first wing portion 114-2 is formed with a hole 30 through which a bolt for a fixation to a vehicle body is passed. As similar to the first embodiment, the second wing portion 114-3 has an end 114-3', to which the breather pipe 12 is welded. The bottom wall portion 114-1 of the bracket 114 makes a close contact with the outer surface of the filler pipe 10 and extends for a length of d in the circumferential direction. Furthermore, the bottom wall portion 114-1 of the bracket 114 is, at its middle portion, formed with a rectangular cut out opening 32 in a manner that the bottom wall portion 114-1 of the bracket 114 has a narrowed width e along the entire periphery of the cut out opening 32. The wing portions 114-2 and 114-3 are raised from the bottom wall portion 114-1 at an angle close to the right angle, so that the bracket 114 is made contact with the outer surface of the filler pipe 10 only at the bottom wall portion 114-1.

In the bracket 114 of the second embodiment, the bottom wall portion 114-1 at its middle is welded to the opposite surface of the filler pipe 10. Furthermore, the welding is done at a welding line along an entire periphery (an inner or outer periphery) of the bottom wall portion 114-1. The bottom wall portion is cut out at its center portion to form the central rectangular shaped opening 32. Thus, the welded part of the bottom wall portion 114-1 has a reduced width of e along the entire periphery, so that the heat as generated when executing the welding is transmitted to the opposite edge remote from the welding line in the similar principle as explained with reference to FIG. 5 of the first embodiment. As a result, the bottom wall portion 114-1 of the bracket 114 and the opposed portion of the filler pipe 10 can form an integral mutually fused structure, so that any existence of a crevice between the filler pipe 10 and the bracket is eliminated, which otherwise may cause a corrosion battery to be formed. As a result, the second embodiment is, also, able to provide a desired corrosion resistance capacity without provision of a coating by paint or metal plating.

Figure 8:
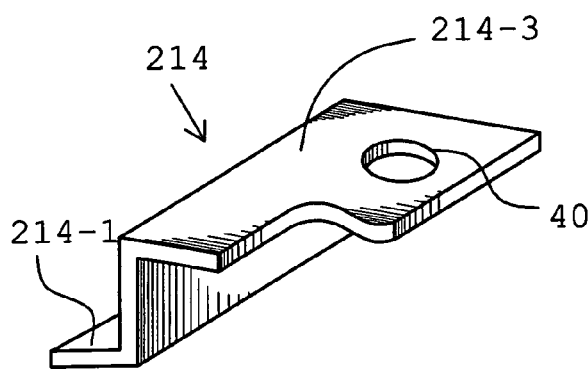
FIG. 8 is a perspective view of a bracket in a third embodiment of the present invention.
Figure 9:
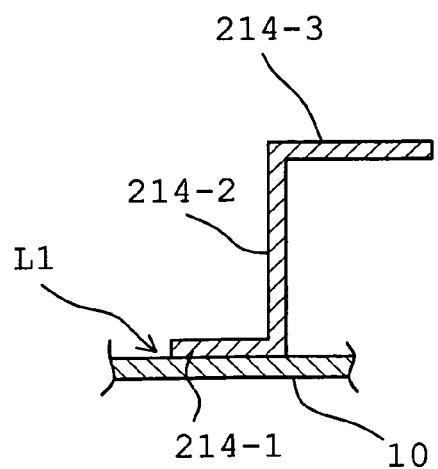
FIG. 9 illustrates a cross-sectional view of the bracket in FIG. 8 when the latter is closed contact condition with the filler pipe.

FIGS. 8 and 9 illustrate a bracket 214 in the third embodiment of the present invention. In this embodiment, the bracket 214 is formed as an angled shape, which constructed by a bottom wall portion 214-1, a wing portion 214-2 raised from the bottom wall portion 214-1 as an angle close to the right angle and an upper wall part 214-3. In this embodiment, the bracket 214 does not formed with a portion for making an attachment to a breather pipe and the upper part 214-3 is only provided with an opening 40 for a passage of a bolt (not shown) for connection to a vehicle body side. The bottom wall part 214-1 is made a close contact with the opposite surface of the filler pipe 10 of a narrow width. Thus, as similar to the first and the second embodiments, a welding by a welding line along the longitudinal direction of the bottom wall portion 214-1 may create an integral portion whereat the bottom wall portion 214-1 of the bracket 214 is, substantially, at its entire part, mutually fused with the opposed portion of the outer surface of the filler pipe 10. Thus, at a connected portion between the filler pipe 10 and the bracket 214, any crevice is substantially eliminated, which otherwise may form a corrosion battery, thereby obtaining a desired corrosion resistance capacity without provision of a coating by paint or metal plating.

Figure 10:
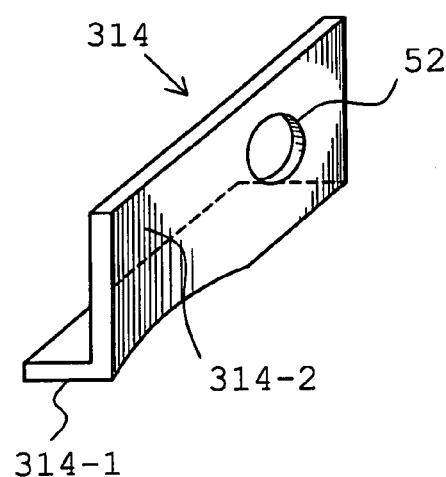
FIG. 10 is a perspective view of a bracket in a third embodiment of the present invention.

FIG. 10 illustrates a bracket 314 of a fourth embodiment. The bracket forms an L cross-sectional shape and has a bottom wall portion 314-1 and a wing portion 314-2 raised from the bottom wall portion 314-1 at an angle close to the right angle. As similar to the third embodiment, the bracket 314 is not formed with a connecting portion to a breather pipe and the wing portion 314-2 is merely formed with a hole 52 for passing through a bolt (not shown) for a connection to a side of the vehicle body. The bottom wall portion 314-1 of the bracket 314 is closely contacted with the opposed surface of the filler pipe and the width of the bottom wall portion 314-1 is narrow. As a result, as similar to the first to third embodiments, the execution of a welding by a welding line along the longitudinal direction of the bottom wall portion 314-1 allows a integrated portion to be created, whereat the bottom wall portion 314-1 of the bracket 314 is, along the entire surface, fused mutually with the opposed portion of the outer surface of the filler pipe. Thus, any crevice in the connected portion between the filler pipe and the bracket 314 is substantially eliminated, which may otherwise may form a corrosion battery, thereby obtaining a desired corrosion resistance capacity without necessity of a coating by a paint or a metal plating.

The invention claimed is:

1. A filler pipe assembly for an automobile, comprising:
    a filler pipe having a longitudinal direction;
    a breather pipe communicating with the filler pipe and extending substantially in parallel with the filler pipe; and
    a bracket comprising:
        an upper part;
        a first bottom portion and a second bottom portion extending from the upper part in a first direction and a second direction respectively, the first and the second directions being opposite directions along the longitudinal direction, the first and the second bottom portions being connected to the filler pipe fusing a substantially entire area of the first and the second bottom portions and a portion of the filler pipe facing the substantially entire area;
        a first wing portion extending from the upper part in a third direction and being to be connected to an automobile body; and
        a second wing portion extending from the upper part in a fourth direction and connected to the breather pipe to support the breather pipe substantially in parallel with the filler pipe, the third and the fourth directions being substantially opposite directions.

2. The filler pipe assembly according to claim 1, wherein the filler pipe and the bracket are made of stainless steel.

3. The filler pipe assembly according to claim 1, wherein the filler pipe and the bracket are coated with cation paint.

4. The filler pipe assembly according to claim 1, wherein the upper part is formed with an opening.

5. A method for producing a filler pipe assembly for an automobile, the method comprising:
    providing a filler pipe having a longitudinal direction;
    providing a breather pipe communicating with the filler pipe and extending substantially in parallel with the filler pipe;
    providing a bracket comprising:
        an upper part;
        a first bottom portion and a second bottom portion extending from the upper part in a first direction and a second direction respectively, the first and the second directions being opposite directions along the longitudinal direction;

a first wing portion extending from the upper part in a third direction and being to be connected to an automobile body; and a second wing portion extending from the upper part in a fourth direction, the third and the fourth directions being substantially opposite directions;

welding the first and the second bottom portions of the bracket to the filler pipe by fusing a substantially entire area of the first and the second bottom portions and a portion of the filler pipe facing the substantially entire area; and connecting the second wing portion to the breather pipe to support the breather pipe substantially in parallel with the filler pipe.

6. The method according to claim 5, further comprising:
subjecting the filler pipe assembly to cation electrodeposition coating.

7. The method according to claim 6, further comprising:
forming an opening in the upper part before the cation electrodeposition coating.

* * * * *